Sept. 30, 1958   G. S. LALIN   2,854,173
DISPENSING APPARATUS
Filed Nov. 15, 1954   3 Sheets-Sheet 1

INVENTOR
GEORG SAM LALIN
BY Young, Emery & Thompson
ATTYS.

Sept. 30, 1958 G. S. LALIN 2,854,173
DISPENSING APPARATUS
Filed Nov. 15, 1954 3 Sheets-Sheet 2
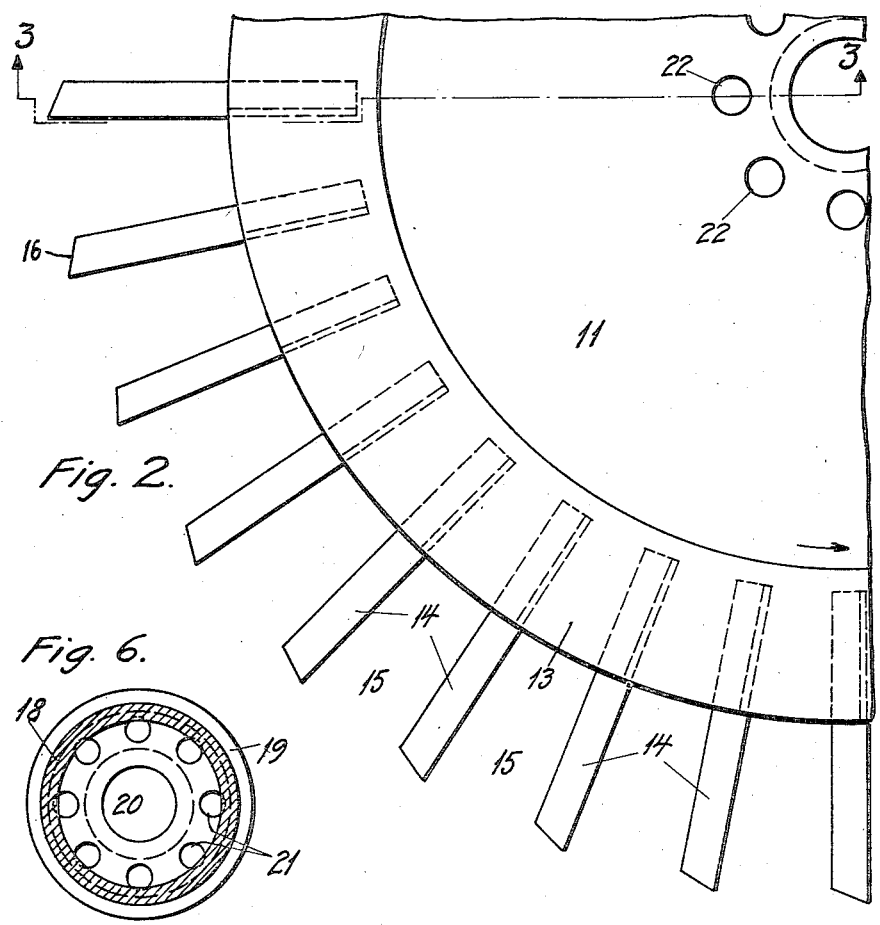
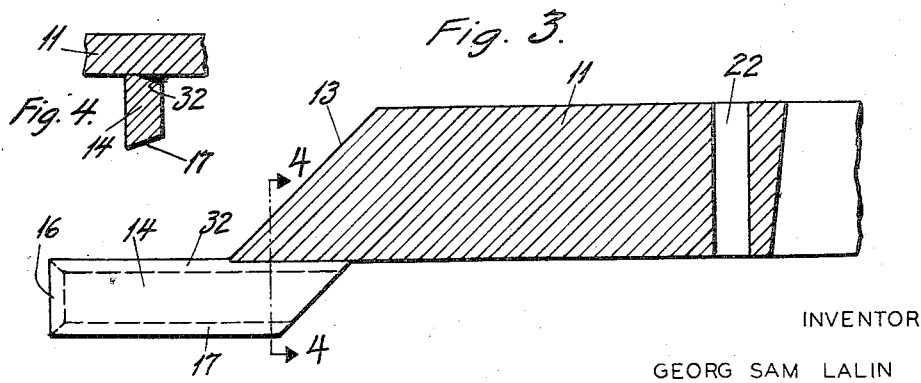
INVENTOR
GEORG SAM LALIN
BY Young, Emery & Thompson
ATTYS.

Sept. 30, 1958
G. S. LALIN
2,854,173
DISPENSING APPARATUS
Filed Nov. 15, 1954
3 Sheets-Sheet 3
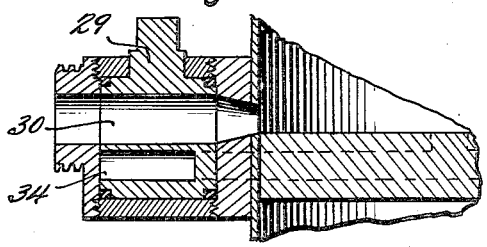
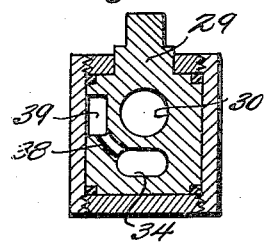
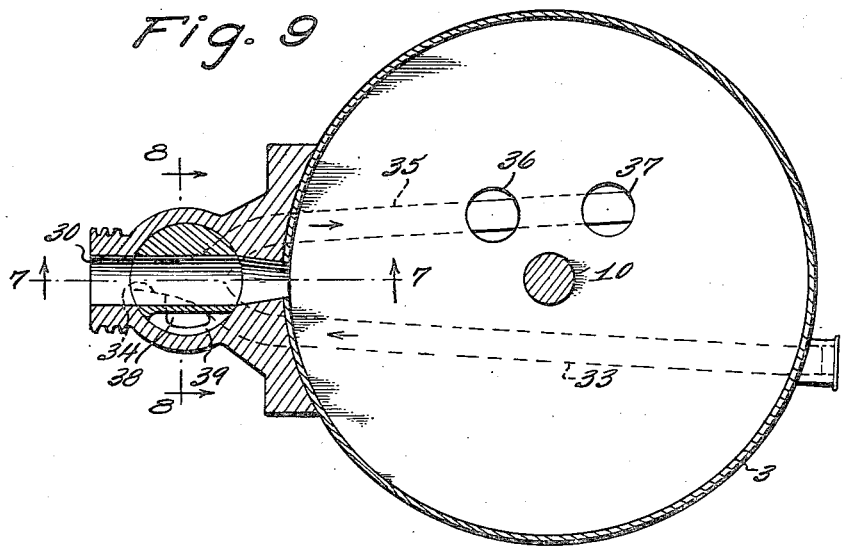
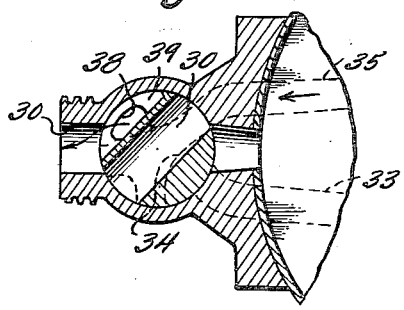
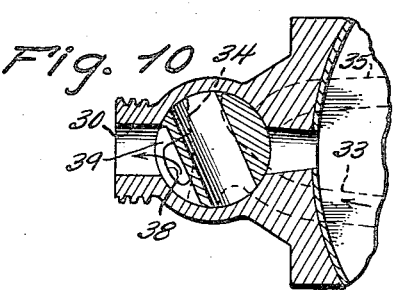
INVENTOR.
GEORG S. LALIN
BY
Irvin S. Thompson
ATTORNEY

United States Patent Office 2,854,173
Patented Sept. 30, 1958

2,854,173

DISPENSING APPARATUS

Georg Sam Lalin, Stockholm, Sweden

Application November 15, 1954, Serial No. 468,959

Claims priority, application Sweden November 18, 1953

2 Claims. (Cl. 222—194)

The present invention relates to dispensing apparatus of the type comprising at the bottom of a container for receiving a dry or substantially dry sand-and-cement mixture a rotatably mounted feed wheel formed at its periphery with a plurality of radially extending cells to be filled with said material mixture, and further comprising means for ejecting the material present in each cell by the aid of air under pressure each time when, in the course of the rotation of the feed wheel, said cell is in alignment with an outlet disposed in the peripheral wall of the container.

In prior dispensing sprayers of the type stated the air under pressure usually has been introduced into the cells of the feed wheel from above through a goose-neck dome disposed close to the upper face of the wheel adjacent the rim thereof and having at its bottom an elongated opening corresponding in shape to that of the cell. Each cell will be discharged as it passes underneath this opening in that the dry or substantially dry material mixture will then be blown out by the air under pressure through the outlet in the peripheral wall of the container and into a discharge hose connected to this outlet.

This prior construction has been found in practice to involve certain drawbacks.

A very frequently occurring inconvenience resides in the tendency for cement to accumulate and set within the air inlet dome or goose-neck so as to clog the compressed-air supply. It is also possible for cement to build up and set below and around the feed wheel resulting in increased wear of the latter. By injecting the air under pressure into the cells from above whilst the outlet from the container is laterally disposed, the sand-and-cement spray will have to change its direction of flow which results in the container bottom beneath the feed wheel being excavated in the region of the outlet and having to be mended from time to time by a hard-facing deposit.

The present invention has for its object to avoid the inconveniencies referred to.

The main feature of the present invention resides in the air under pressure being introduced below the feed wheel and ejecting the material from out of each cell along a substantially straight path by a pressure acting from the rear end of the cell.

By this means the inconvenience of the air inlet domes or goosenecks referred to involving accumulation and setting of cement within the dome will be completely avoided. Furthermore, the air pressure existing below the feed wheel will prevent material from being forced in between container and feed wheel. The load of the bunch of material on top of the feed wheel will be greately counter-balanced by the air pressure. The wear in the region of the outlet from the container will be unnoticeable owing to the straight-line ejection.

Incidentally, the compresser-air introduction below the feed wheel will also enable certain advantageous arrangement of other facilities associated with the dispensing apparatus, as will appear from the following disclosure.

A preferred embodiment of the dispensing apparatus according to the invention will now be described by way of example, reference being had to the accompanying drawings in which:

Fig. 2 is a fractional plan view, on a larger scale, of the feed wheel.

Fig. 3 is an axial section through the feed wheel taken along the line 3—3 in Fig. 2.

Fig. 4 is a cross-section along the line 4—4 in Fig. 3, through one of the radially extending walls forming the cells of the feed wheel.

Figures 1, 5:
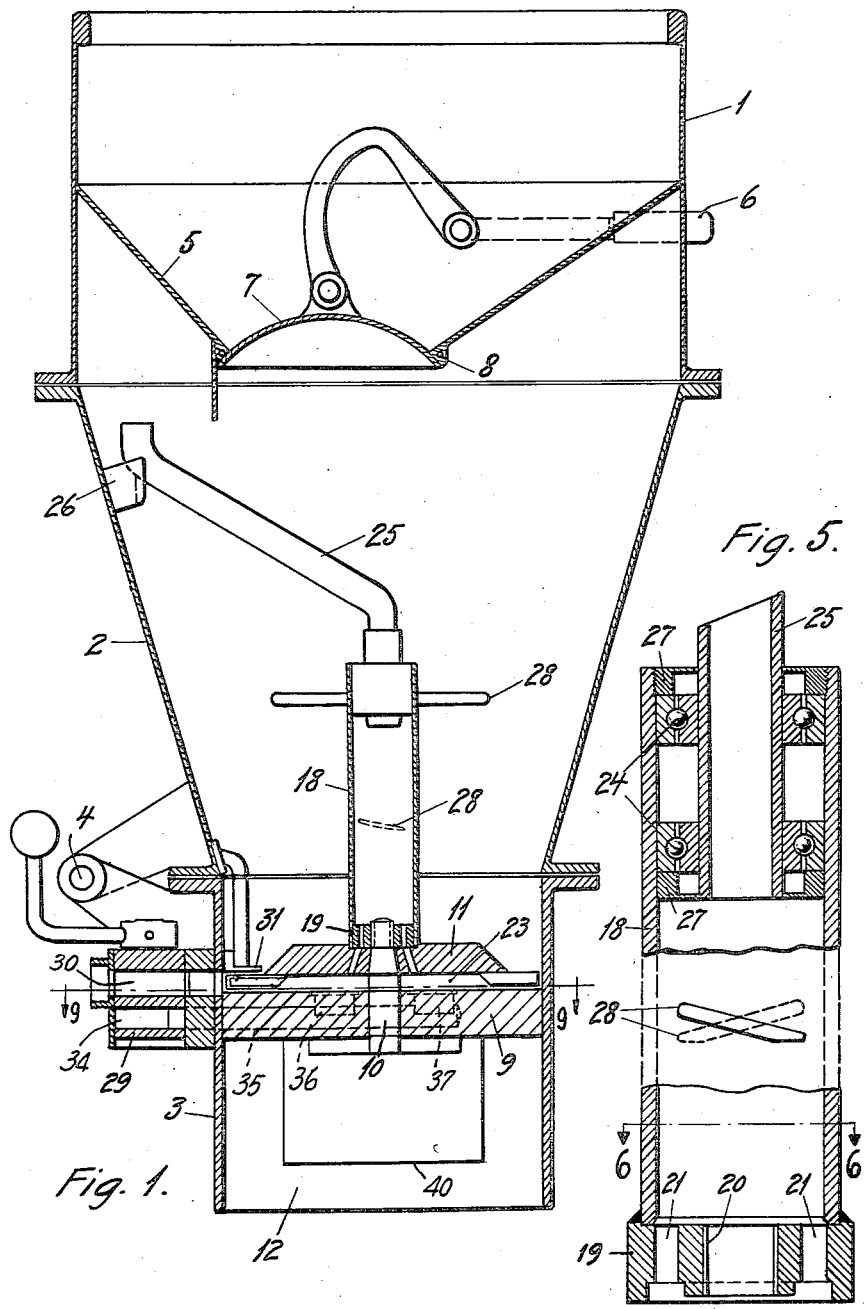
Fig. 1 is a vertical section through the dispensing apparatus.

Fig. 5, on a larger scale, shows an axial section through a tube affixed centrally to the feed wheel.

Fig. 6 is a cross-section taken along the line 6—6 in Fig. 5.

Fig. 7 is a longitudinal section through a valve means along line 7—7 of Fig. 9.

Fig. 8 is a longitudinal section through the same valve along line 8—8 of Fig. 9.

Fig. 9 is a cross section along line 9—9 of Fig. 1.

Figs. 10 and 11 are cross sections similar to that of Fig. 9 but with the valve body in other positions.

Referring now to the drawings, as appears from Fig. 1, the casing of the dispensing apparatus consists of an upper cylindrical segment 1, a downwardly tapering frustro-conical segment 2 connected thereto, and a lower cylindrical segment 3. The frustro-conical segment 2 and the lower cylindrical segment 3 are interconnected by hinges 4 or the like whereby, after removing bolts, the frustro-conical segment 1 together with the upper segment can be canted to expose the feed wheel.

Disposed within the upper cylindrical segment 1 is a built-in charging hopper 5 having disposed across its discharge opening a gate lid 7 with a sealing ring 8 of rubber or the like and exteriorly operable by means of a lever 6.

The lower cylindrical segment 3 has inserted therein a bottom plate 9 in which the spindle 10 of a feed wheel 11 is rotatably mounted. The space 12 below the bottom plate 9 serves for the reception of a worm drive or other suitable gearing through which the feed wheel is driven from, for example, an electric motor, the motor and gearing assembly being shown at 40.

The construction of the feed wheel will appear from Figs. 2 and 3. The wheel comprises a circular disc 11 having its rim 13 bevelled at 45° and provided with a plurality of substantially rectangular sheet-metal plates 14 projecting radially outward therefrom, said plates being, as by welding, secured to the underside of the disc 11 and forming between them cells 15 which open in all directions except laterally. The extreme outer edges 16 of these plates are closely spaced from the surrounding cylindrical container wall 3, and the lower edges 17 of the plates are similarly closely spaced from the top face of the bottom plate 9. It is preferred that the edges 16 and 17, respectively, of the plates be bevelled or chamfered in the manner indicated in Fig. 2, and in the sectional view of Fig. 4, respectively. The direction of rotation of the feed wheel is that indicated by the arrow in Fig. 2 (i. e. counter-clockwise).

Extending vertically upward from the central portion of the feed wheel 11 is a comparatively coarse-sized tube 18. To the lower end of this tube is welded a ring 19 having a screw-threaded central bore 20 by which the tube is screwed onto the correspondingly screw-threaded end of the feed wheel spindle 10. The thread is preferably right-handed whereby tightening will occur automatically when the sense of rotation of the feed wheel is that indicated. Surrounding the threaded central bore 20 of the ring 19 is a circular row of smaller holes 21 by which the interior of the tube 18 communicates with the space 23 below the disc 11 of the feed wheel through the intermediary of corresponding holes 22 in the feed disc.

Within the upper end of the tube 18 is mounted by means of ball bearings 24 the lower end of a smaller-diameter pipe 25 which extends obliquely upwards and opens into the upper portion of the frustro-conical container segment 2, to one side of the gate lid 17. The pipe 25 is secured against rotation between a couple of lugs 26 projecting inwardly from the conical wall 2. Sealing rings 27 are disposed between the narrow pipe 25 and the more coarse-sized tube 18.

The wider central tube 18 has secured thereon one or more pairs of vanes 28. These vanes are inclined in such a manner as, when the feed wheel 11 is rotated, to exert a lifting action on the bunch of material within the container and thus counteract any compacting thereof.

The delivery from the dispensing apparatus is controlled by a supply valve 29 having an outlet passage 30 which preferably is slightly divergent in order to minimize the tendency of cement clogging therein. This supply valve is also utilized for controlling the supply of compressed air into the space 23 below the feed wheel 11 through a system of passages disposed in the bottom plate 9. The supply valve has three control positions, viz. a first position I (shown in Fig. 9) in which a compressor or other source of air under pressure is in communication with the space 23 below the feed wheel through a passage 33 in the bottom plate 9, a space 34 in the valve body 29, a passage 35 in the bottom plate 9 and outlets 36 and 37 in said bottom plate and in which the passage 30 through the supply valve is open permitting material to be discharged into the hose connected thereto; a second position II (shown in Fig. 10) in which these two passage-ways are interrupted and the compressor or other source of air under pressure is in direct communication with the hose through passage 33 in the bottom plate 9, space 34 in the valve body 29, and further spaces 38, 39 therein communicating with space 34, as shown in Fig. 8; and a third position III (shown in Fig. 11) in which the two first-mentioned connections are interrupted and the space 23 below the feed wheel 11 is vented to atmosphere through passage 35 and spaces 34, 38 and 39 in the valve body.

In operation, sand- and cement-mixture is charged into the container 2 through the upper gate up to a suitable level (not exceeding the upper end of the pipe 25). The feed wheel 11 is rotated counter-clockwise (see Fig. 2) and the vanes 28 effect an agitating and lifting action on the bunch of material in the container so that the material will not get compacted. If the feed valve is placed in the position shown in Fig. 9, air under pressure will flow into the space 23 below the feed wheel and thence through the centrally disposed tube 18 and the offset and inclined pipe 25 to the free space above the bunch of material in the container. Furthermore, each cell 15 of the feed wheel on its arrival in alignment with the outlet as the wheel rotates will have its contents discharged by the air under pressure in the space 23 blowing the material out of the cell from the rear along a substantially straight path through the passage-way 30 in the supply valve.

Upon adjustment of the valve into the second position (Fig. 10) air under pressure from the compressor or other source of compressed air will flow directly into the discharge hose enabling the surface being sprayed to be cleaned by air-blasting. In the third position (the "off" position, Fig. 11) of the supply valve the space 23 below the feed wheel is in communication with the ambient air whereby the air under pressure above the bunch of material within the container can be vented through the tubes 25 and 18, the space 23, openings 36, 37, passage 35 in the bottom plate 9, passages 34 and 38 in the supply valve 29, the discharge hose and its spray nozzle.

By bevelling or chamfering the outer and lower edges of the walls 14 laterally bounding the cells 15 of the feed wheel in the manner specified wedging of grains of sand between the feed wheel and container walls will be prevented, whereby in the construction described it will be possible to use sand the largest grains of which have diametrical dimensions amounting to 5 to 6 times the clearance between the feed wheel and the peripheral wall and bottom, respectively, of the container.

It is to be understood that various modifications of the arrangement specified are possible within the scope of the appended claims. Thus it would be suitable, for instance, to dispose a baffle plate 31 above the cells 15 very close to the upper edges of the cell plates in the region of the outlet from the container 2, 3, said baffle plate serving to prevent the material mixture from escaping in an upward direction. The baffle plate is suitably rigidly connected with the frustro-conical segment 2 so as to be canted upwardly together therewith thus not obstructing the exposure of the feed wheel as described. Out of reasons depicted in respect of the bevelling of the edges 16 and 17 of the cell walls 14, when using this baffle plate, the upper edges of these cell walls should also be bevelled or chamfered, as illustrated at 32 in Figs. 3 and 4.

The apparatus, though primarily intended for dispensing concrete ingredients, is also applicable for spraying so-called "silica gravel" for the lining of cupola furnaces, for spraying lime-cement mixture in house building work etc.

What I claim is:

1. In an apparatus for feeding a substantially dry mixture of sand and hydraulic cement and the like material, a closable container for receiving said material and provided with an outlet opening in the lateral wall adjacent its bottom, a rotatable horizontally disposed feed wheel near the bottom of the container provided on its underside at the periphery with a plurality of radially disposed plates projecting beyond the rim of said feed wheel and defining between said bottom and the underside of said wheel a plurality of upwardly, outwardly and inwardly open cells and a central free space with the inner end of each cell in constant communication with said free space, a source of power for rotating said feed wheel, means for supplying air under pressure into said space so as to cause the material present within said cells to be discharged from each cell along a substantially straight path through said outlet opening in the lateral wall of said container each time when said cell is in alignment with said outlet opening, a tubular member secured centrally to the upper face of said feed wheel and partaking in the rotation of the latter and being in communication with said space below said feed wheel, and an angularly bent stationary pipe mounted on the upper end of said centrally disposed tubular member and extending upwardly at an angle and opening above the level of the free upper surface of the mixture of material within the container.

2. In an apparatus for feeding a substantially dry mixture of sand and hydraulic cement and the like material, a closable container for receiving said material and provided with an outlet opening in the lateral wall adjacent its bottom, a rotatable horizontally disposed feed wheel near the bottom of the container provided on its underside at the periphery with a plurality of radially disposed plates projecting beyond the rim of said feed wheel and defining between said bottom and the underside of said wheel a plurality of upwardly, outwardly and inwardly open cells and a central free space with the inner end of each cell in constant communication with said free space, a source of power for rotating said feed wheel, means for supplying air under pressure into said space so as to cause the material present within said cells to be discharged from each cell along a substantially straight path through said outlet opening in the lateral wall of said container each time when said cell is in alignment with said outlet opening, a tubular member secured centrally to the upper face of said feed wheel and partaking in the rotation of the latter and being in communication with said space below said feed wheel, an angularly bent stationary pipe mounted on the upper end of said centrally disposed tubular member and extending upwardly at an angle and opening above the level of the free upper surface of the mixture of material within the container, and vanes secured to said centrally disposed tubular member so as to be adapted to effect a lifting action on the material in the container and prevent compacting thereof.

References Cited in the file of this patent

UNITED STATES PATENTS

| | | |
|---|---|---|
| 2,299,565 | Colburn | Oct. 20, 1942 |
| 2,637,539 | Crom | May 5, 1953 |
| 2,644,724 | Kronstad | July 7, 1953 |